United States Patent [19]
Muona

[11] Patent Number: 5,699,261
[45] Date of Patent: Dec. 16, 1997

[54] CONTROL ARRANGEMENT FOR ROCK DRILLING EQUIPMENT

[75] Inventor: Jouko Muona, Vuorentausta, Finland

[73] Assignee: Tamrock Oy, Finland

[21] Appl. No.: 605,210

[22] PCT Filed: Feb. 15, 1995

[86] PCT No.: PCT/FI95/00072

§ 371 Date: Sep. 5, 1996

§ 102(e) Date: Sep. 5, 1996

[87] PCT Pub. No.: WO95/23275

PCT Pub. Date: Aug. 31, 1995

[30] Foreign Application Priority Data

Feb. 28, 1994 [FI] Finland ................... 940937

[51] Int. Cl.[6] ........................................ G06F 19/00
[52] U.S. Cl. ............... 364/474.02; 364/180; 364/424.07; 175/24
[58] Field of Search .............. 364/474.01, 474.02, 364/167.01, 160, 180, 181, 188, 189, 191, 192, 193, 146, 474.14, 424.07; 173/2–11, 176–183; 172/2; 175/24–27, 38

[56] References Cited

U.S. PATENT DOCUMENTS

| 4,146,271 | 3/1979 | Ward et al. | 364/181 X |
| 4,521,845 | 6/1985 | Schwefel | 364/181 X |
| 4,566,061 | 1/1986 | Ogden et al. | 364/181 X |
| 4,793,421 | 12/1988 | Jasinski | 175/27 |
| 5,224,033 | 6/1993 | Nakamura et al. | 364/180 X |

FOREIGN PATENT DOCUMENTS

| 901-478 | 1/1982 | U.S.S.R. |
| 2 064 623 | 6/1981 | United Kingdom |

*Primary Examiner*—Joseph Ruggiero
*Attorney, Agent, or Firm*—Nixon & Vanderhye P.C.

[57] ABSTRACT

An arrangement for control means in rock drilling equipment, comprising an electronic control unit for controlling operating means. The control unit comprises an electronic basic set-value memory storing set values for the operating parameters of the different operating means; and a separate electronic operator set-value memory in which the operator can store set values he wants to give to the operating parameters of the different operating means. The control unit can be connected to read the set values for the operating parameters from either one of the memories.

4 Claims, 1 Drawing Sheet

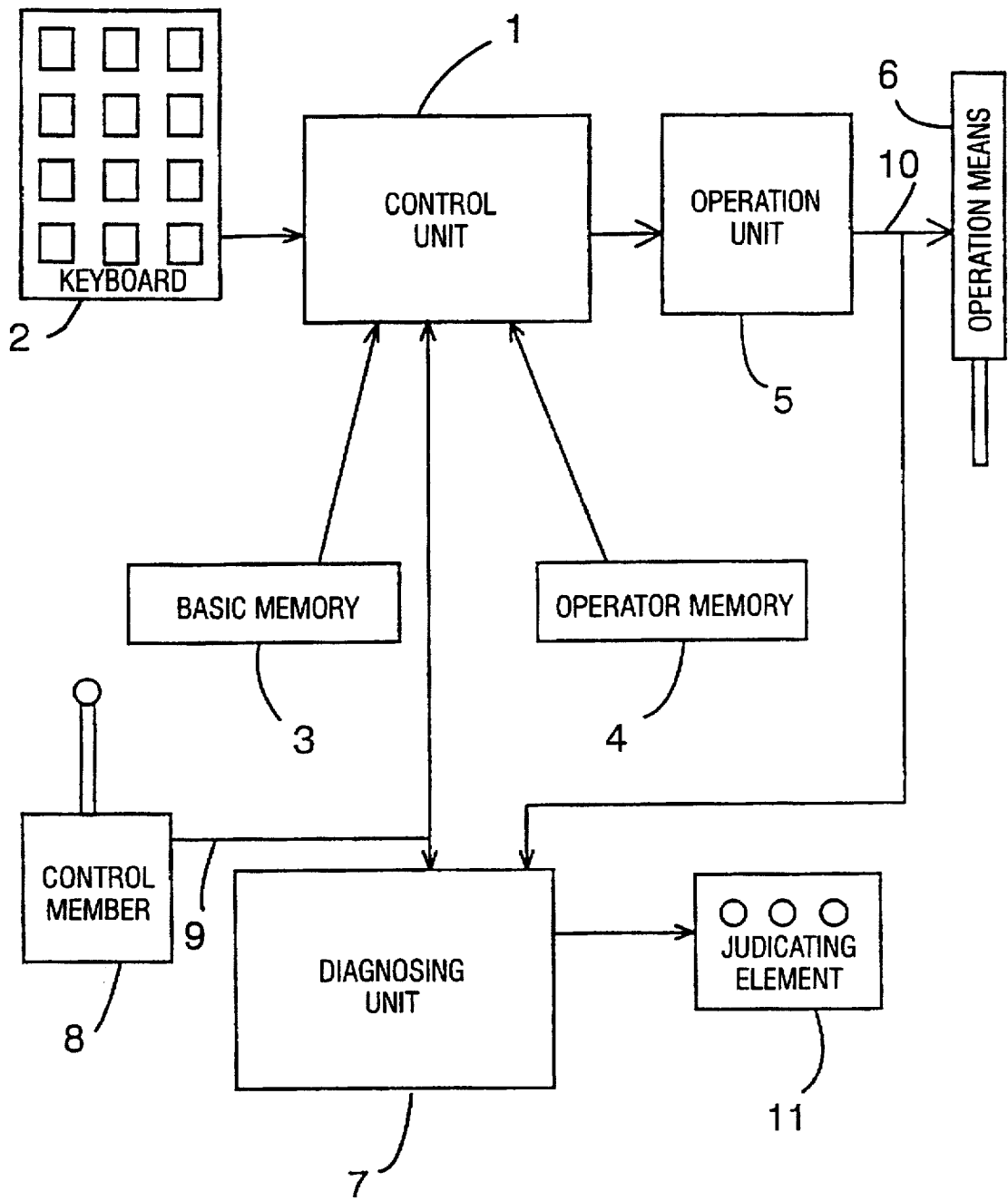

CONTROL ARRANGEMENT FOR ROCK DRILLING EQUIPMENT

BACKGROUND

The invention relates to an arrangement for control means in rock drilling equipment, comprising at least one control member for controlling operating means of a rock drill; an electronic control unit connected to the control member for controlling the operating means on the basis of a control signal from the control member; a set-value adjuster for setting the operations of the control unit; and means for setting the operating parameters of each operating means.

Various control means are used today for controlling and adjusting the different rock drilling operations. In such control means, various control parameters are also set for the different operations. These control parameters determine the feed, percussion and operating values of a rock drill in the different operational situations, such as collaring and normal drilling in the rock drilling process.

As is well-known, the operations and operating parameters of the different operating means are set in present-day control means by adjusters provided in each adjustment unit or in a separate control unit for the control means, i.e. electronically by using adjusting resistors each one of which is adjusted mechanically until a desired operating value and set value is achieved. In practice, the preliminary adjustment is performed at the factory stage either according to preset values or by performing drilling experiments and testing the operation of the drilling equipment and then making the adjustment accordingly.

In the normal use of the equipment, the driller typically needs different modes of operation and operating values than those preset at the factory. Adjusting resistors are thus adjusted in different ways, which in some cases results in poor and inefficient operation. As these adjusters do not have any clear fixed initial position, the re-adjustment of the equipment to the original set values is laborious and complicated and causes costs and wastes work time. In addition, poorly adjusted equipment is less productive and thus expensive in use.

SUMMARY OF THE INVENTION

The object of the present invention is to provide an arrangement which allows drilling values to be initially set easily and simply and which also allows the drilling values to be adjusted if required while the initial set values can nevertheless be restored simply and easily.

The arrangement according to the invention is characterized in that the setting means comprise an electronic basic set-value memory in which the set values of the operating parameters of the different operating means are programmed permanently and from which the control unit is able to read them; a separate electronic operator set-value memory in which the operator can store desired set values for the operating parameters of the different operating means by means of the set-value adjuster and from which the control unit is able to read the operating parameter values so set by the operator for each operating means, whereby the operator is able to select the operating parameter values of either one of the memories for the control of the operating means.

An essential aspect of the invention is that the control means have a separate basic set-value memory, in which the basic set values of the different operating parameters that have previously proved appropriate are programmed at the factory stage. Another essential aspect of the invention is that the control means comprise a separate operator set-value memory, into which the driller can feed desired set values from a controller, such as a keyboard, so as to achieve the desired operating parameters. Still another essential aspect of the invention is that the operating parameters can be restored to the original values set at the factory by reintroducing the parameter set values stored in the basic set-value memory. According to another embodiment of the invention, the arrangement further comprises a separate diagnosing unit capable of monitoring the functioning of set parameters so as to find out if the settings are appropriate. This allows any illogical or faulty operations to be detected.

An advantage of the arrangement according to the invention is that the operating parameters of the equipment can be set at the factory easily and simply in a desired manner merely by suitably programming the basic set-value memory on the basis of experiences gained. Another advantage of the invention is that it is easy for the operator to try different parameter set values by varying them according to his wishes. If the end result is not satisfactory, the original basic settings can be restored merely by reintroducing the set values stored in the basic set-value memory. The entire adjusting procedure and the testing of the parameters of the equipment are thus simple, and set values proved to be appropriate can be restored simply and rapidly.

The invention will be described more fully with reference to the attached drawing, in which the block diagram illustrates the arrangement according to the invention.

BRIEF DESCRIPTION OF THE DRAWING

The single FIGURE is a block diagram of the control arrangement according to the invention.

DETAILED DESCRIPTION OF THE DRAWINGS

The control arrangement as shown in the FIGURE comprises an electronic control unit 1; a set-value adjuster for setting operating parameters, such as a keyboard 2, which controls the control unit; a basic set-value memory 3 associated with the control unit or positioned within it; and an operator set-value memory 4 for storing the set values desired by the operator. The control unit 1 is further arranged to control operating means 6 e.g. through a separate operation unit 5 provided for the control of each operating means 6. The operating means 6 collectively refers to various drives, such as a hydraulic cylinder, a rotation motor for a rock drill, a percussion machinery, a feed motor or other drive device associated with the operation of the boom or the rock drill. The operation unit 5 in turn may be mounted either close to the operating means or attached to it or it may be positioned in a separate space provided for the operating means on the carrier of the drilling equipment, whereby the operation unit communicates with the operating means 6 through e.g. hydraulic hoses or the like for operating and controlling it. This technique is well-known per se and obvious to one skilled in the art, and therefore will not be described more closely.

When the equipment is being manufactured, the manufacturer programs the basic set-value memory 3 of the control unit 1 so that when the control unit is used, it obtains the control and operating parameters of the different operating means from the basic set-value memory 3. This can be done either by reading them directly from the basic set-value memory or by transferring the values from the basic set-value memory 3 either into the operator set-value memory 4 or into a separate control memory provided within the control unit 1. The use of data stored in a memory as such is known per se, and will therefore not be described more closely.

When the operator, that is, the driller, wants to alter the set values, he may feed them by the keyboard 2 into the operator set-value memory 4. Values that have not been altered by the operator are thus obtained from the basic set-value memory, and values that have been altered are obtained from the operator set-value memory. In practice, this can be done e.g. by transferring the set values stored in the basic set-value memory into the operator set-value memory, whereafter the operator alters these set values so that all of the set values are read from the operator set-value memory or transferred into the separate control memory possibly provided within the control unit 1.

If the set values are set for some reason in such a way that the drilling operates poorly, the basic settings can be restored simply in such a way that the control unit again starts to use the set values stored in the basic set-value memory by inputting a special set-value command from the keyboard 2.

The diagram also illustrates the diagnosing of the control operation. A diagnosing unit 7 compares the control values inputted by the operator by a control member 8, such as a joystick, with the actual values of the control values applied from the control unit to the operating means. The diagnosing unit 7 is connected to monitor the control value applied by the control member 8 to a control line 9 and the adjustment value applied by the control unit or the operation unit to an adjustment line 10 for the operating means. The diagnosing unit monitors these values and indicates the operation by a separate indicating element 11. This indicating element may be e.g. a flashing light, such as a LED indicator having a flashing frequency proportional to the control value of the control member or to the difference between the control value and the adjustment value. It may also be a row of lights consisting of LED indicators positioned one after another, a scale-indicator display, a picture tube display, and so on. Diagnosing can be done e.g. in such a manner that the actual operating means is not used but the control value of the control member is merely compared with the adjustment value applied from the control unit or the operation unit to the operating means. If the values differ from each other more than e.g. by a predetermined maximum difference value, the indicating element 11 can indicate the difference e.g. by switching from flashing light into continuous light or vice versa, or indicate in some other way that the control value of the control member 8 and the resultant adjustment value of the operating means do not correspond to each other. It is thereby easy to detect that there is a failure in the equipment. If desired, the diagnosing unit may also be provided with means for indicating whether the failure is in the control unit or in the operation unit, for instance. This can be done by diagnosing the operation of one control device at a time, whereby it is easier to locate the failure.

The invention has been described above and shown in the drawing by way of example, and is not in any way limited to this example. The operation and interconnection of the memories and the introduction of parameters set in the memories in the control unit can be realized in different ways. Transfer between the basic set-value memory and the operator set-value memory may also be performed either from a keyboard or by using a separate switch by means of which either one of the memories can be taken into use. The set values of the operating parameters stored in the memories can be displayed to the operator on a separate display unit in an appropriate form, so that the operator can compare the basic set values and the values he has set himself, if he so desires.

I claim:

1. A control arrangement in rock drilling equipment, comprising at least one control member for controlling a plurality of different drives of the rock drilling equipment; an electronic control unit connected to the control member for controlling said plurality of drives on the basis of a control signal from the control member; a set-value adjuster for setting the operations of the control unit; an electronic basic set-value memory in which set values of operating parameters of the different drives are programmed permanently and from which the control unit is able to read them; a separate electronic operator set-value memory in which the operator can store one or more different set values for the operating parameters of the different drives by means of the set-value adjuster and from which the control unit is able to read the operating parameter values so set by the operator for each of said plurality of drives, and wherein the operator is able to select the operating parameter values of either one of the memories for the control of said plurality of drives.

2. The control arrangement according to claim 1, wherein the set-value adjuster for the operating parameters is a keyboard by means of which the selection of the memory for the control unit and the setting of the operating parameters in the operator set-value memory are controlled.

3. The control arrangement according to claim 1, wherein the basic set-value memory and the operator set-value memory are integral with the control unit, and the basic set-value memory is programmed in connection with the manufacture of the rock drilling equipment.

4. The control arrangement according to claim 1, and further comprising for each of said plurality of drives, an operation unit controlled by said control unit and wherein said control arrangement further comprises a separate diagnosing unit connected to a control signal line of the control member and to an adjustment line of the operation unit, and wherein the diagnosing unit compares a control value in the control signal line with an adjustment value in the adjustment line between the operation unit and the drives and indicates by means of an indicating element how the adjustment value and the control value correspond to each other.

\* \* \* \* \*